United States Patent
Nam et al.

(10) Patent No.: US 10,686,203 B2
(45) Date of Patent: Jun. 16, 2020

(54) PEPTIDE-INORGANIC MATERIAL COMPOSITE FILM AND MANUFACTURING METHOD THEREOF

(71) Applicant: Seoul National University R&DB Foundation, Seoul (KR)

(72) Inventors: Ki Tae Nam, Seoul (KR); Yoon-Sik Lee, Anyang-si (KR); Young-O Kim, Gwangju (KR); Jaehun Lee, Yongin-si (KR); Ik Rang Choe, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 209 days.

(21) Appl. No.: 15/836,271

(22) Filed: Dec. 8, 2017

(65) Prior Publication Data

US 2018/0166722 A1 Jun. 14, 2018

(30) Foreign Application Priority Data

Dec. 14, 2016 (KR) .................. 10-2016-0170598
Sep. 7, 2017 (KR) .................. 10-2017-0114751

(51) Int. Cl.
*H01M 8/1016* (2016.01)

(52) U.S. Cl.
CPC ...... *H01M 8/1016* (2013.01); *H01M 2250/20* (2013.01); *H01M 2300/0065* (2013.01); *H01M 2300/0068* (2013.01); *H01M 2300/0091* (2013.01); *Y02E 60/521* (2013.01); *Y02P 70/56* (2015.11)

(58) Field of Classification Search
CPC ....... H01M 8/1016; H01M 2300/0091; H01M 2250/20; H01M 2300/0065; H01M 2300/0068; Y02P 70/56; Y02E 60/521
USPC ............................................ 429/495
See application file for complete search history.

(56) References Cited

U.S. PATENT DOCUMENTS 8,796,023 B2    8/2014  Reches et al.
2007/0077276 A1*  4/2007  Haynie ............... A61K 39/385
                                                424/423
2014/0349941 A1* 11/2014  Wilson ............... A61K 38/04
                                                514/15.4

FOREIGN PATENT DOCUMENTS

| JP | 2007523890 A | 8/2007 |
| KR | 100739537 B1 | 7/2007 |
| KR | 1020090002895 A | 1/2009 |
| KR | 1020140082970 A | 7/2014 |
| KR | 1020140124582 A | 10/2014 |
| KR | 1020160033260 A | 3/2016 |
| WO | 2005101993 A2 | 11/2005 |

OTHER PUBLICATIONS

Chao-Nan Xu et al., Humidity sensors using manganese oxides, 1998, pp. 87-96, Sensors and Actuators, B 46, Elsevier.

(Continued)

*Primary Examiner* — Gary D Harris
(74) *Attorney, Agent, or Firm* — Cantor Colburn LLP

(57) ABSTRACT

A peptide-inorganic material composite film according to an exemplary embodiment of the present invention includes: a unit peptide including 4 to 15 amino acids, and a transition metal oxide hybridized with the unit peptide, wherein the unit peptide includes at least two tyrosines, and the plurality of unit peptides positioned adjacent to each other have a form in which the tyrosines are linked.

9 Claims, 11 Drawing Sheets

(56) References Cited

OTHER PUBLICATIONS

David D. Ordinario et al., Bulk protonic conductivity in a cephalopod structural protein, 2014, pp. 596-602, vol. 3, No. 7, Nature Chemistry, Macmillan Publishers Limited.

Erik E. Josberger et al., Proton conductivity in ampullae of Lorenzini jelly, 2016, pp. 1-6, Science Advances, vol. 2.

Hyung-Seok Jang et al., Tyrosine-mediated two-dimensional peptide assembly and its role as a bio-inspired catalytic scaffold, 2014, pp. 1-11, Nature Communications, 5:3665 | DOI: 10.1038, Macmillan Publishers Limited.

Maqsood Ahmad Malik et al., Oxidation of tyrosine by permanganate in presence of cetyltrimethylammonium promide, 2010, p. 346-353, 76, Colloids and Surfaces B: Biointerfaces, Elsevier.

Minyoung Yoon et al., Proton Conduction in Metal—Organic Frameworks and Related Modularly Built Porous Solids, 2013, pp. 2688-2700, 52, Angewandte Minireviews, Wiley-VCH Verlag GmbH & Co. KGaA, Weinheim.

Nadav Amdursky et al., Long-Range Proton Conduction across Free-Standing Serum Albumin Mats, 2016, p. 1-7, Advanced Materials, Wiley-VCH Verlag GmbH & Co. KGaA, Weinheim.

Scott A. Norris et al., Molecular dynamics of single-particle impacts predicts phase diagrams for large scale pattern formation, 2011, pp. 1-6, 2:276, Nature Communications, Macmillan Publishers Limited.

Yasufumi Umena et al., Crystal structure of oxygen-evolving photosystem II at a resolution of 1.9A, 2011, pp. 55-61, vol. 473, Nature, Macmillan Publishers Limited.

Yasuhiro Tachibana et al., Artificial photosynthesis for solar water-splitting, 2012, pp. 511-518, vol. 6, Nature Photonics, Macmillan Publishers Limited.

Yoshikatsu Ueda et al., Electrochemical property of proton-conductive manganese dioxide for sensoring hydrogen gas concentration, 2012, pp. 282-285, Solid State Ionics, Elsevier.

\* cited by examiner (a)

(b)

(a)

(b)

PEPTIDE-INORGANIC MATERIAL COMPOSITE FILM AND MANUFACTURING METHOD THEREOF

CROSS-REFERENCE TO RELATED APPLICATION

This application claims priority to and the benefit of Korean Patent Application No. 10-2016-0170598 and 10-2017-0114751 filed in the Korean Intellectual Property Office on Dec. 14, 2016 and Sep. 7, 2017, the entire contents of which are incorporated herein by reference.

BACKGROUND (a) Field

The present invention relates to a peptide-inorganic material composite film and a manufacturing method thereof. More specifically, the present invention relates to a peptide-inorganic material composite film having proton conductivity and a manufacturing method thereof.

(b) Description of the Related Art

Proton transport occurring in the natural world plays an important role in not only chemical reactions such as oxidation/reduction reactions and acid/base catalysis but also proton pump action and nerve signaling essential for bioenergy production, etc. The proton transport is also deeply involved in core functions of energy-related devices such as fuel cells, batteries, sensors, and electrolyzers in view of industrial aspect, and has been intensively studied in various fields for the last 200 years.

Recently, an exhaustion problem of fossil energy sources has become serious, and thus, the demand for the fuel cells due to fuel cell vehicles using hydrogen as an energy source is on the rise. To manufacture a high-efficiency fuel cell, a material having excellent proton conductivity is required.

Further, as a part of bioelectronics, a device that monitors biological changes in real time, predicts/treats diseases in advance, and replaces some functions of the living body is being studied. To realize an electronic device capable of being implanted into a living body or a human body, it is essential to develop a material capable of performing the transport of proton, which is a signaling method having excellent biocompatibility and being used in the natural world.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a peptide-inorganic material composite film having advantages of having excellent biocompatibility and proton transporting ability. The present invention has been made in an effort to provide a manufacturing method of a peptide-inorganic material composite film in which manufacturing processes are simple and mass production is easily performed.

However, these technical problems are exemplarily described and do not limit the scope of the present invention. The technical problems to be achieved by the present invention are not limited to the above-mentioned technical problems and therefore, other technical problems can be clearly understood by those skilled in the art to which the present invention pertains from the following description.

An exemplary embodiment of the present invention provides a peptide-inorganic material composite film including: a unit peptide including 4 to 15 amino acids, and a transition metal oxide hybridized with the unit peptide, wherein the unit peptide includes at least two tyrosines, and the plurality of unit peptides positioned adjacent to each other have a form in which the tyrosines are linked.

According to an embodiment of the present invention, the peptide-inorganic material composite film may include dityrosine.

According to an embodiment of the present invention, the transition metal oxide may include any one selected from the group consisting of Mn, Co, Cu, Ni, Fe, Zr, Zn and Ce.

According to an embodiment of the present invention, the transition metal oxide may be represented by Chemical Formula 1 below:

$$A_{1-\delta}O \qquad \text{[Chemical Formula 1]}$$

in Chemical Formula 1, A is a transition metal, and $\delta$ is $0<\delta<0.5$. According to an embodiment of the present invention, the $\delta$ may be $0<\delta<0.25$, $0.25<\delta<\frac{1}{3}$ or $\frac{1}{3}<\delta<0.5$ According to an embodiment of the present invention, the transition metal oxide may include at least two of divalent, trivalent and quadrivalent transition metals. According to an embodiment of the present invention, the peptide-inorganic material composite film may have an absorbance of 0.05 to 0.7 at a wavelength of 280 to 500 nm According to an embodiment of the present invention, a PL intensity of the tyrosine may decrease as a content of the transition metal oxide increases at a wavelength of 305 nm.

According to an embodiment of the present invention, resistance of the peptide-inorganic material composite film may decrease as relative humidity increases.

According to an embodiment of the present invention, the unit peptide may have at least one of YYYY, YYCYY, YDCDY, YHCHY, YFCFY, FYCYF, YYYCYYY, YFACAFY, and YYACAYY sequences.

According to an embodiment of the present invention, Y may be tyrosine, A may be alanine, C may be cysteine, D may be aspartic acid, H may be histidine, and F may be phenylalanine.

Another embodiment of the present invention provides a manufacturing method of a peptide-inorganic material composite film, including: preparing a peptide solution including a unit peptide that includes 4 to 15 amino acids, manufacturing a peptide film by using the peptide solution, and immersing the peptide film in a transition metal oxide aqueous solution to perform dip-coating.

The peptide-inorganic material composite film as described above may have biocompatibility while having a high proton transporting ability. The manufacturing method of the peptide-inorganic material composite film may save time and cost due to simple processes. The scope of the present invention is not limited by these effects.

DETAILED DESCRIPTION OF THE EMBODIMENTS

Figure 1:
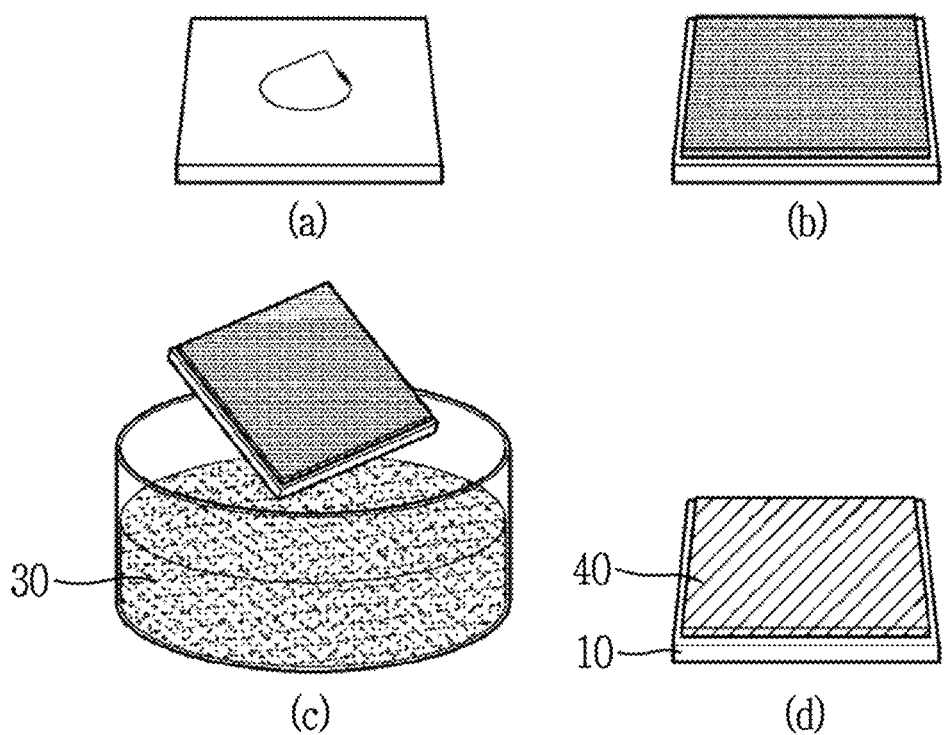
FIG. 1 is a schematic diagram showing a manufacturing process of a peptide-inorganic material composite film according to an exemplary embodiment of the present invention in panels (a) to (d).

Embodiments of the present invention will be described in detail with reference to the accompanying drawings. These exemplary embodiments will be described in detail for those skilled in the art in order to practice the present invention. It should be appreciated that various exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that position and arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. In the drawings, like reference numerals refer to the same or similar functions throughout several aspects, and length, area, thickness, etc., and shapes thereof may be exaggerated for convenience.

Hereinafter, exemplary embodiments of the present invention will be described in detail with reference to the accompanying drawings so that those skilled in the art may easily practice the present invention.

Figure 2:
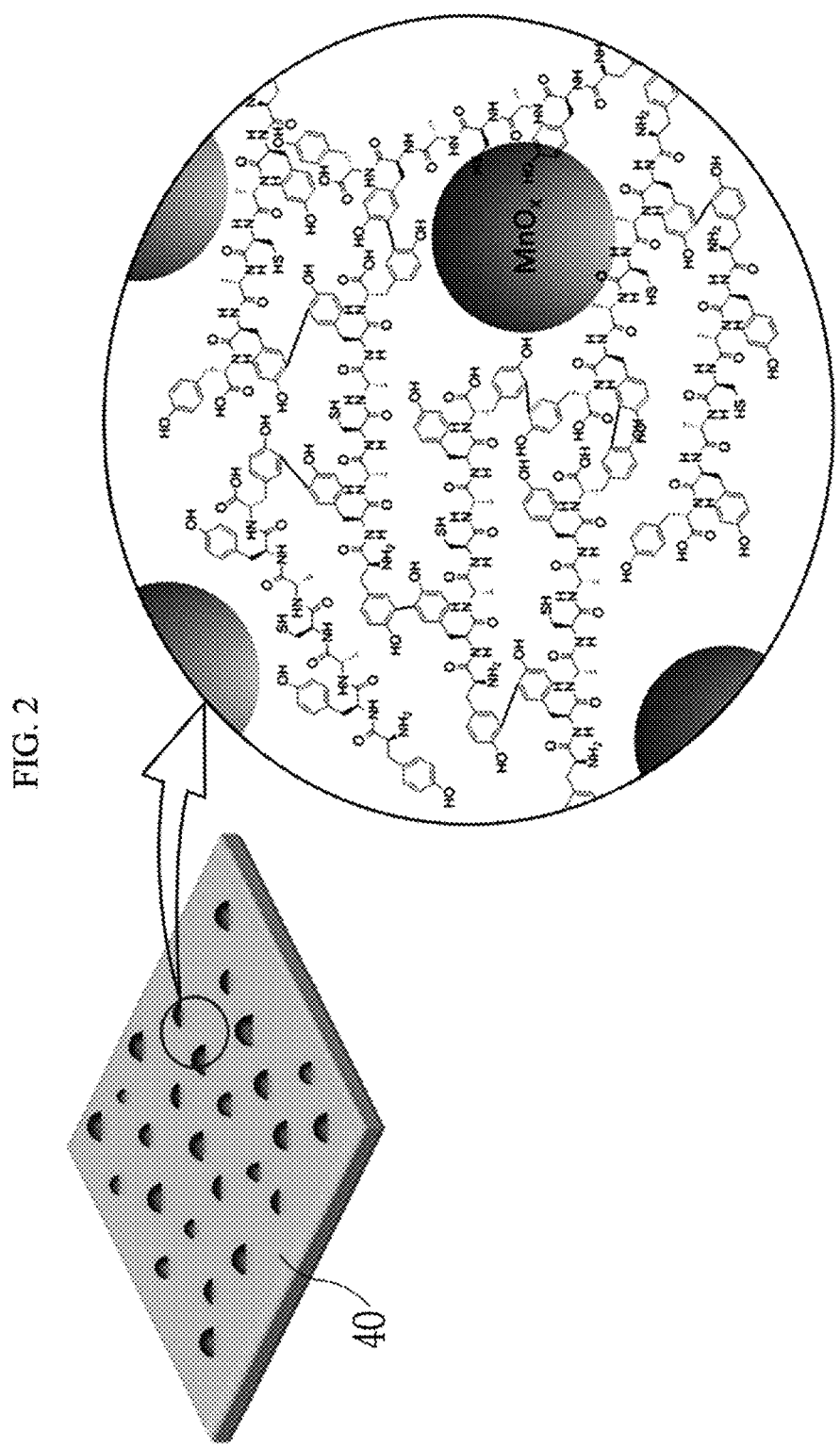
FIG. 2 is an enlarged view of a partial region of the peptide-inorganic material composite film according to an exemplary embodiment of the present invention.
Figure 3:
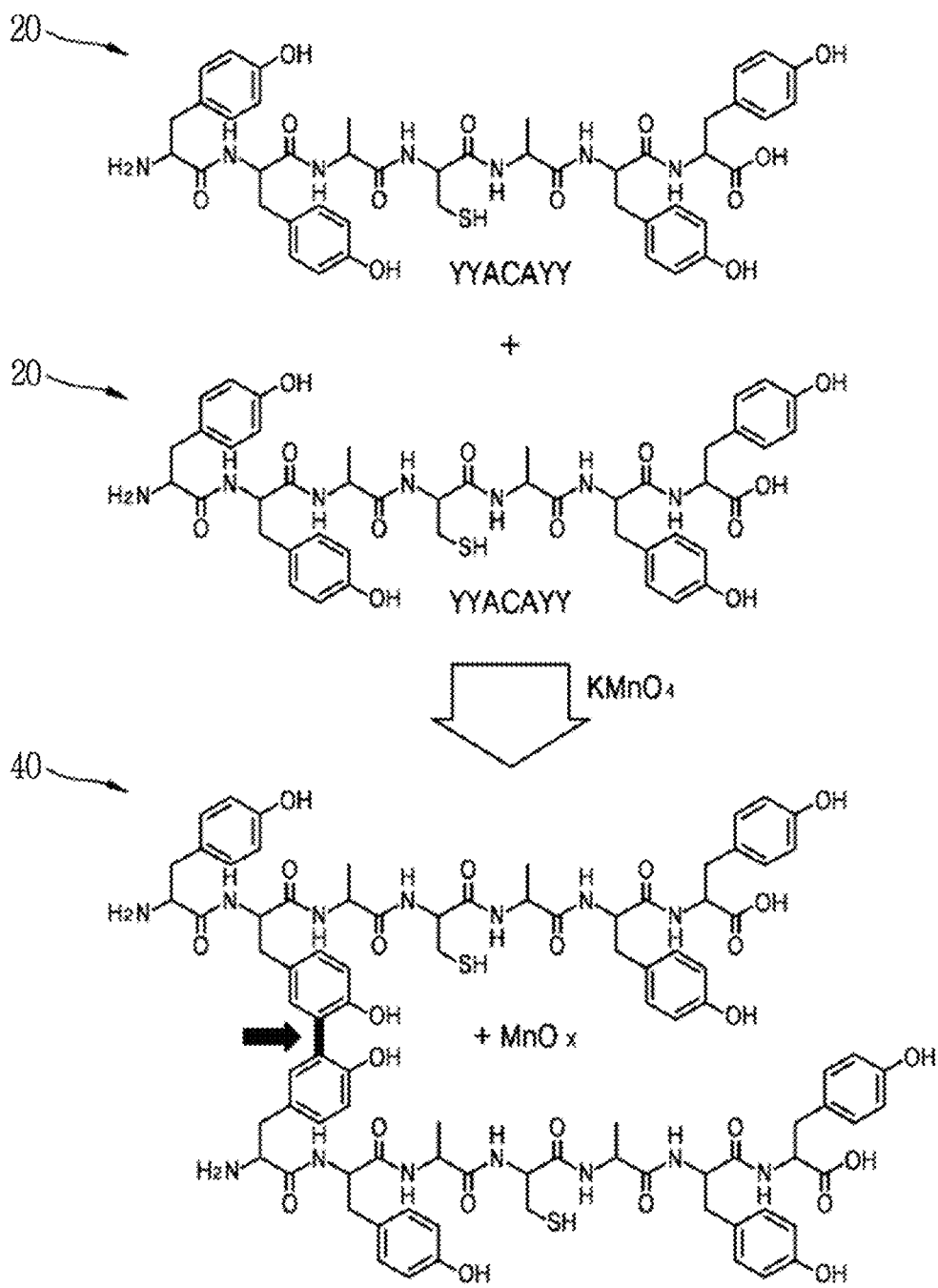
FIG. 3 is a schematic diagram showing a state in which a peptide and an inorganic material are hybridized according to an exemplary embodiment of the present invention.

Hereinafter, a peptide-inorganic material composite film 40 according to an exemplary embodiment of the present invention and a manufacturing method thereof will be described with reference to FIGS. 1 and 3. FIG. 1 is a schematic diagram showing a manufacturing process of a peptide-inorganic material composite film 40 according to an exemplary embodiment of the present invention, FIG. 2 is an enlarged view of a partial region of the peptide-inorganic material composite film according to an exemplary embodiment of the present invention, and FIG. 3 is a schematic diagram showing a state in which a peptide and an inorganic material are hybridized according to an exemplary embodiment of the present invention.

Referring to FIG. 1, a manufacturing method of a peptide-inorganic material composite film according to an exemplary embodiment of the present invention includes: preparing a peptide solution 20 including a plurality of unit peptides, forming a peptide film 21 from the peptide solution 20, and immersing the peptide film 21 in a transition metal oxide aqueous solution 30 to perform dip-coating.

First, referring to FIG. 1, panel (a), the peptide solution 20 including the plurality of unit peptides is prepared.

The unit peptide is a compound in which a plurality of amino acids are linked by a peptide bond. The peptide according to an exemplary embodiment of the present invention may have a shorter length than biopolymers such as protein, polysaccharide, melanin, etc.

The unit peptide according to an exemplary embodiment may include about 4 to about 15 amino acids. The amino acid may include at least two, preferably, three or more tyrosines (Tyr, Y).

Tyrosine includes an aromatic ring, and two tyrosines may be dimerized with a transition metal oxide interposed therebetween to form dityrosine. According to an exemplary embodiment, as shown in FIG. 2, a plurality of adjacent unit peptides may have a form in which tyrosines are bonded to each other.

Referring to FIG. 3, as an example, a unit peptide including at least one of YYYY, YYCYY, YDCDY, YHCHY, YFCFY, FYCYF, YYYCYYY, YFACAFY and YYACAYY sequences may be used. As an example, a unit peptide including 7 amino acids forming the YYACAYY sequence may be used. Here, Y represents tyrosine, A represents alanine (Ala, A), and C represents cysteine (Cys, C).

The peptide solution 20 may be prepared by dissolving the plurality of unit peptides prepared as described above in hexafluoroisopropanol (HFIP). The unit peptide may have a concentration of about 5 mg/ml to about 20 mg/ml, and the higher the concentration of the solution, the thicker the film may be obtained after a spin coating process. However, it is not limited to the above concentration, and other solvents may be selected within the range in which the peptide is dissolved.

Sonication and heating processes may be further included to increase dissolution efficiency of the peptide with respect to the peptide solution 20. Here, since the solvent may evaporate, the heating process condition may be about 40 degrees (° C.) or less.

Next, referring to FIG. 1, panel (b), the peptide film 21 is manufactured from the peptide solution 20 including the plurality of unit peptides.

Specifically, the peptide solution 20 may be spin-coated on the substrate 10. The spin coating process may be performed at about 2000 to 3000 rpm for 30 seconds. Then, the remaining solvent is removed. Heat treatment at 150° C. for 30 minutes may be further performed to increase adhesion force of the substrate 10 and the peptide film 21. According to these processes, the peptide film 21 having a thin film form may be manufactured on the substrate 10.

Referring to FIG. 1, panel (c), the peptide film 21 may be immersed in the transition metal oxide aqueous solution 30 to perform dip-coating.

The peptide film 21 may be immersed in the transition metal oxide aqueous solution 30 to perform dip-coating, and thus, the transition metal oxide may react with amino acids in the peptide film 21. The reaction time, i.e., the dip coating process time, may be about 5 minutes to 60 minutes. When the dip coating is performed for less than 5 minutes, the transition metal oxide and the amino acids may not react sufficiently, and when the dip coating is performed for more than 60 minutes, the transition metal oxide may be bonded excessively in the peptide film 21, and thus, proton conductivity may be somewhat lowered.

The transition metal oxide bonded to the amino acid by the present exemplary embodiment may have a non-stoichiometric composition and may be represented by Chemical Formula 1 below:

$$A_{1-\delta}O$$ [Chemical Formula 1]

in Chemical Formula 1, A is any one selected from the group consisting of Mn, Co, Cu, Ni, Fe, Zr, Zn and Ce as a transition metal, and δ satisfies 0<δ<0.5.

The non-stoichiometric composition may be understood to mean that a thermodynamically stable quantitative relationship between the transition metal and oxygen is excluded in a compound consisting of the transition metal and oxygen. As an example, in the case of a manganese oxide, a stoichiometric manganese oxide may include MnO, $Mn_3O_4$, $Mn_2O_3$, and $MnO_2$. According to an exemplary embodiment of the present invention, the composition may be a composition except that the manganese oxide δDeletedTextshaving a non-stoichiometric composition is 0.25 and ⅓ while satisfying 0<δ<0.5. The may satisfy 0<δ<0.25, 0.25<δ<⅓ and ⅓<δ<0.5.

The transition metal oxide may include a divalent transition metal (for example, divalent manganese MnII), a trivalent transition metal (for example, trivalent manganese MnIII), and a tetravalent transition metal (for example, tetravalent manganese MnIV), and at least two of divalent, trivalent, and tetravalent transition metals may be positioned on a surface of the transition metal oxide. The divalent, trivalent, and tetravalent transition metals positioned on the surface of the transition metal oxide may be thermodynamically unstable. The divalent, trivalent, and tetravalent transition metals positioned on the surface of the transition metal oxide may have a kind of defect form which is not positioned in a lattice structure.

The transition metal oxide aqueous solution 30 is an aqueous solution including transition metal oxides such as manganese oxide, etc., and may be, for example, a $KMnO_4$ solution. When the transition metal oxide aqueous solution 30 is a $KMnO_4$ solution, $MnO_x$ may be reacted and hybridized with the amino acids in the peptide film 21 as shown in FIG. 2.

Referring to FIGS. 2 and 3, $MnO_x$ having a non-stoichiometric composition may be hybridized and bonded with the peptide while interposing the transition metal oxide in an aromatic ring of the tyrosine of the peptide.

Referring again to FIG. 1, panel (d), the substrate 10 may be taken out from the transition metal oxide aqueous solution 30, followed by washing and drying to obtain a peptide-inorganic material composite film 40 on the substrate 10.

As described above, the peptide-inorganic material composite film (40) of the present invention may be manufactured by a simple process including the forming process of the peptide film and the dip coating process of the peptide film in the transition metal oxide aqueous solution.

Hereinafter, characteristics of the peptide-inorganic material composite film as described above will be described with reference to FIGS. 4 to 10.

Figure 4:
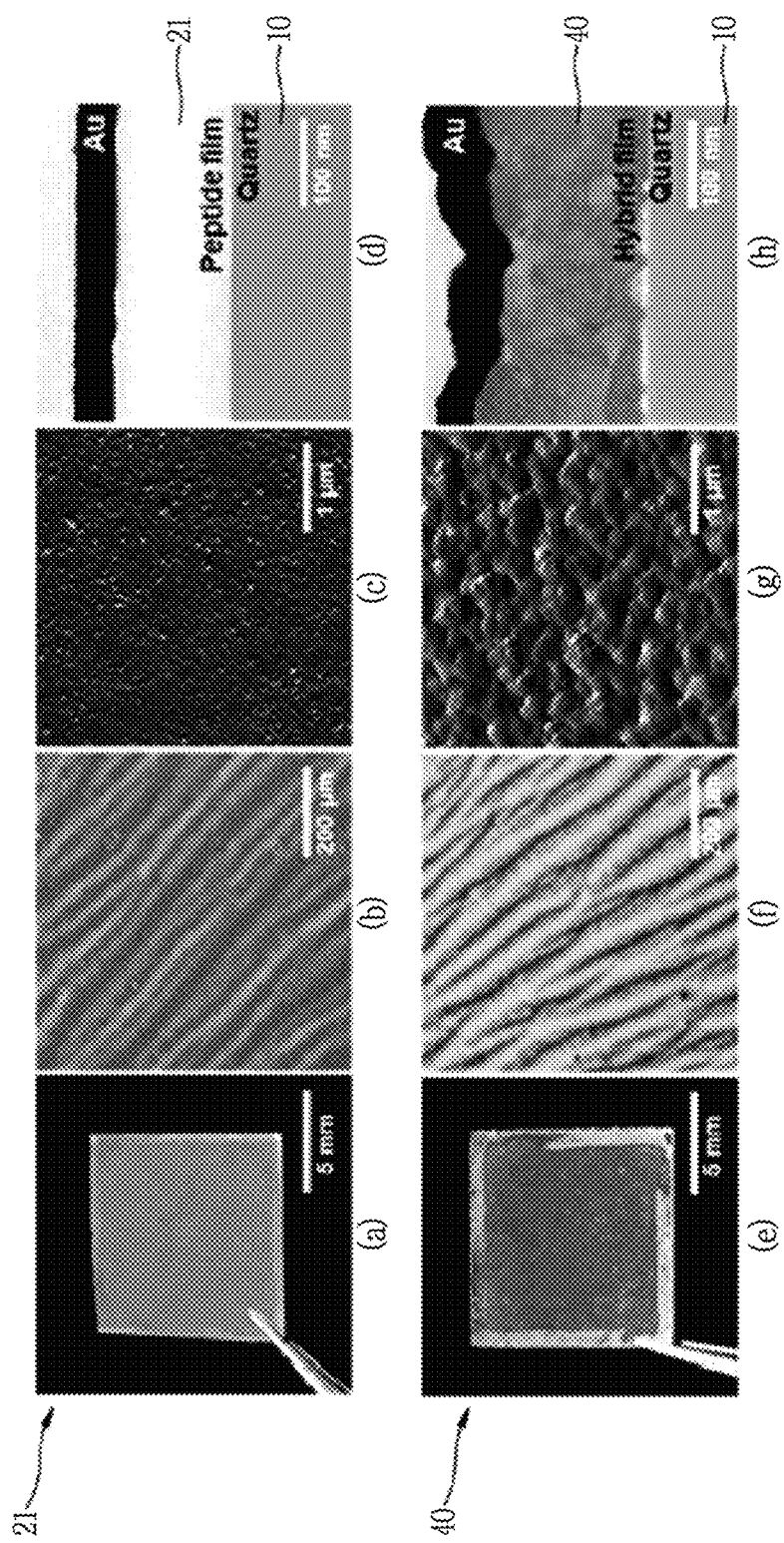
FIG. 4 presents images in panels (a) to (h) of peptide films and the peptide-inorganic material composite films according to an experimental example of the present invention.

In FIG. 4, panels (a) to (d) are images of the peptide film 21 and panels (e) to (h) are images of the peptide-inorganic material composite film 40. FIG. 4, panels (a) and (e) are the respective film images, panels (b) and (f) are microscopic observation images, panels (c) and (g) are surface images using atomic force microscopy (AFM), and panels (d) and (h) are cross-sectional transmission electron microscopy (TEM) images.

Referring to FIG. 4, panels (a) to (d), the peptide film 21 is transparent and has a smooth surface and a smooth cross section. Referring to FIG. 4, panels (e) to (h), it may be confirmed that the peptide-inorganic material composite film 40 is light brown, and has rough surface and cross section. Since the transition metal oxide ($MnO_x$) is interposed into the peptide stacked in the peptide film 21, color, surface and cross-sectional state are changed.

Figure 5:
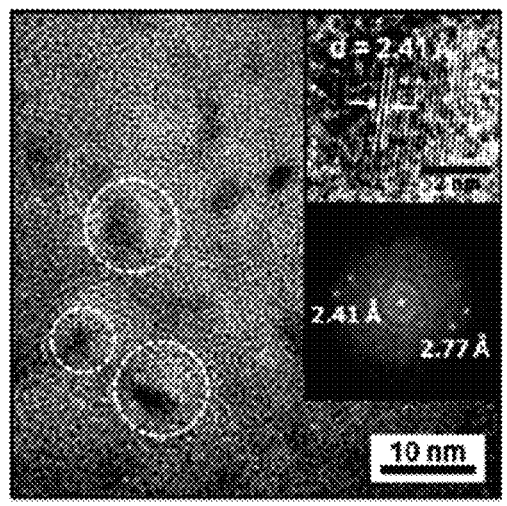
FIG. 5 presents experimental results for an exemplary embodiment of the peptide-inorganic material composite film. Panel (a) is a transmission electron microscopy (TEM) image of the peptide-inorganic material composite film according to an experimental example of the present invention, and panel (b) is a graph showing a result of an X-ray absorption near edge structure (XANES).
Figure 5:
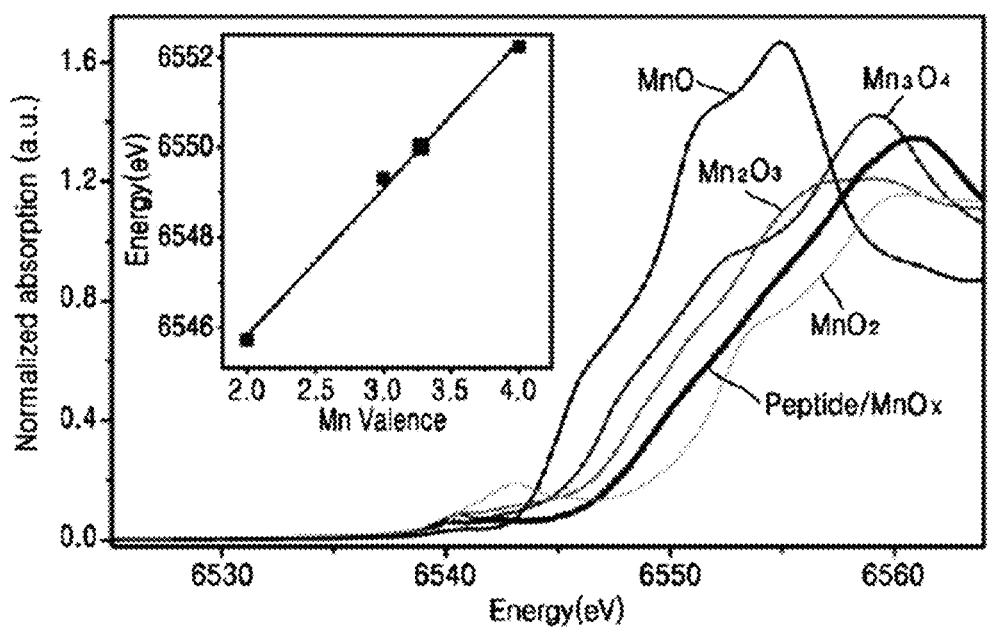

FIG. 5, panel (a) is a transmission electron microscopy (TEM) image of the peptide-inorganic material composite film 40 according to an experimental example of the present invention, and FIG. 5, panel (b) is a graph showing a result of an X-ray absorption near edge structure (XANES).

Referring to FIG. 5, panel (a), it may be confirmed that the transition metal oxide ($MnO_x$) particles have a diameter of 6 nm±1 nm and are embedded in the peptide-inorganic material composite film 40. It may be confirmed that space d values are 2.41 Å and 2.77 Å, which are matched with $MnO_2$, and $Mn_2O_3$. Accordingly, it may be confirmed that both the trivalent transition metal and the tetravalent transition metal are positioned on the surface of the transition metal oxide.

Referring to FIG. 5, panel (b), it was confirmed that a Mn atomic valence (or oxidation state) of the peptide-inorganic material composite film 40 is about 3.3. That is, it was confirmed that both of trivalent manganese and tetravalent manganese are included.

Figure 6:
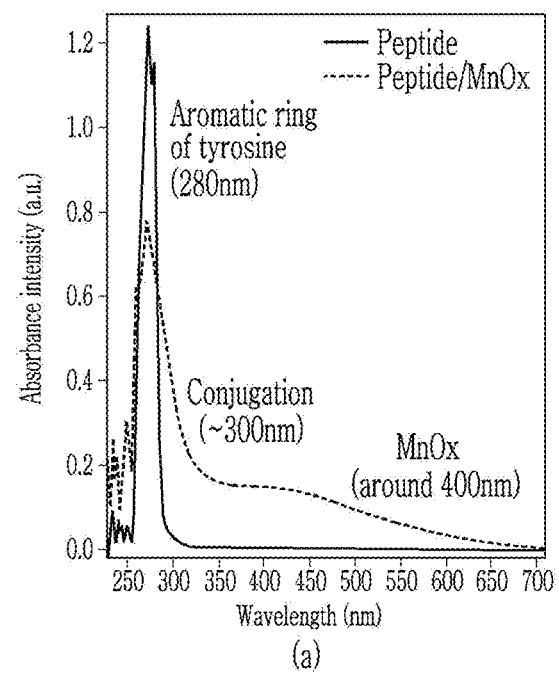
FIG. 6 presents spectroscopic data. Panel (a) shows a UV-Vis absorption spectrum of the peptide film and the peptide-inorganic material composite film according to an experimental example of the present invention, and panel (b) is an infrared spectroscopy (IR) graph.
Figure 6:
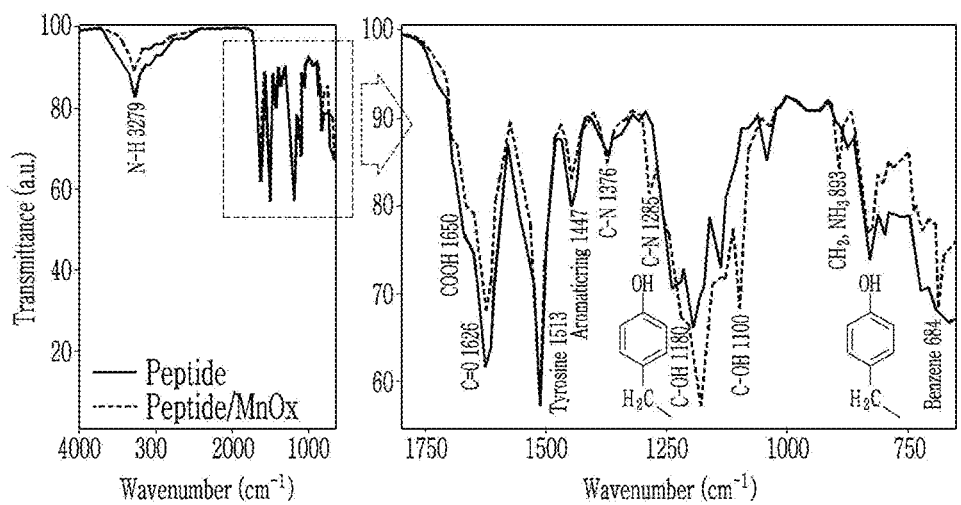

FIG. 6 is a graph showing spectroscopic characteristics of the peptide film 21 and the peptide-inorganic material composite film 40 according to an experimental example of the present invention. Panel (a) of FIG. 6 shows a UV-Vis absorption characteristic of the peptide film and the peptide-inorganic material composite film according to an experimental example of the present invention, and panel (b) is an infrared spectroscopy (IR) graph.

Referring to panel a of FIG. 6, it was confirmed that a 280 nm peak indicated by tyrosine of the peptide film 21 was also observed in the peptide-inorganic material composite film 40. This is because a product obtained by oxidation still has a 4-hydroxyphenyl group.

Further, the peptide-inorganic material composite film 40 may exhibit absorption at 300 nm, indicating that there is molecular conjugation in the composite material. An absorption characteristic having a broad band up to a wavelength region of 500 nm or more of the peptide-inorganic material composite film 40 was exhibited. The absorption characteristic of about 0.05 to 0.7 was exhibited in a band of about 270 nm to about 500 nm. This is a characteristic that appears from the cross-linked peptide compound and the transition metal oxide ($MnO_x$).

FIG. 6, panel (b) shows a change in an aromatic ring of tyrosine as a result of infrared spectroscopy (IR).

Figure 7:
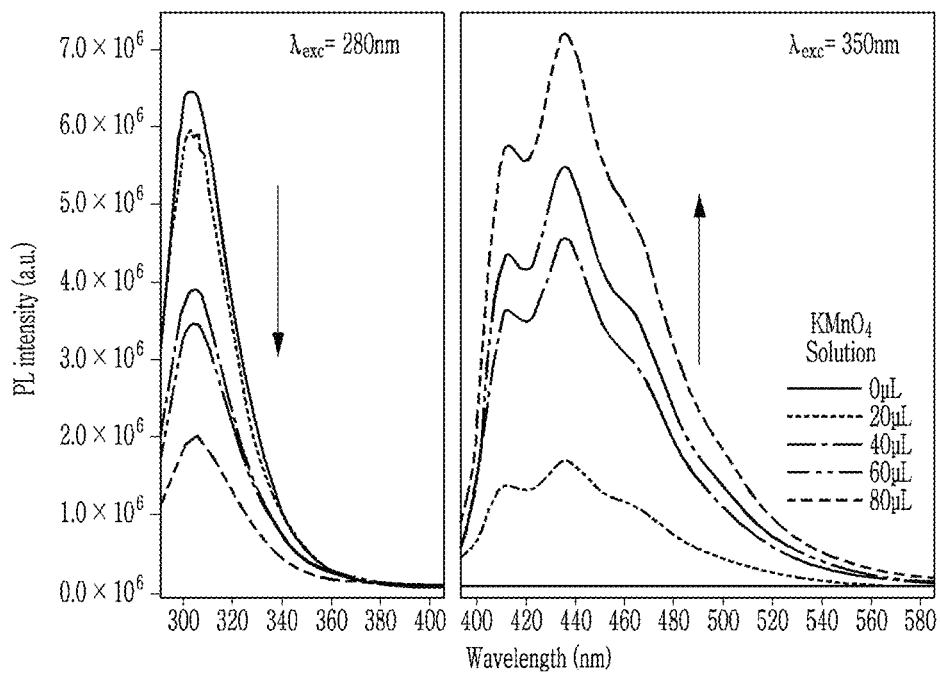
FIG. 7 depicts photoluminescence characteristics according to an experimental example of the present invention, with panel (a) presenting photoluminescence spectra and panel (b) depicting the excitation and emission wavelengths of tyrosine and dityrosine.
Figure 7:
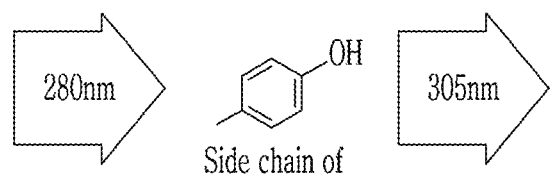

FIG. 7 presents photoluminescence characteristics according to an experimental example of the present invention.

Referring to panels (a) and (b) of FIG. 7, an emission band for 280 nm excitation indicated by tyrosine is 305 nm. An intensity of the 305 nm band decreases as the concentration of the $KMnO_4$ solution increases. That is, it was confirmed that as the content of the transition metal oxide increased, PL intensity decreased.

In addition, an emission band for 350 nm excitation is also about 413 nm, 435 nm and 465 nm. In particular, the 413 nm band may be induced from dityrosine.

Figure 8:
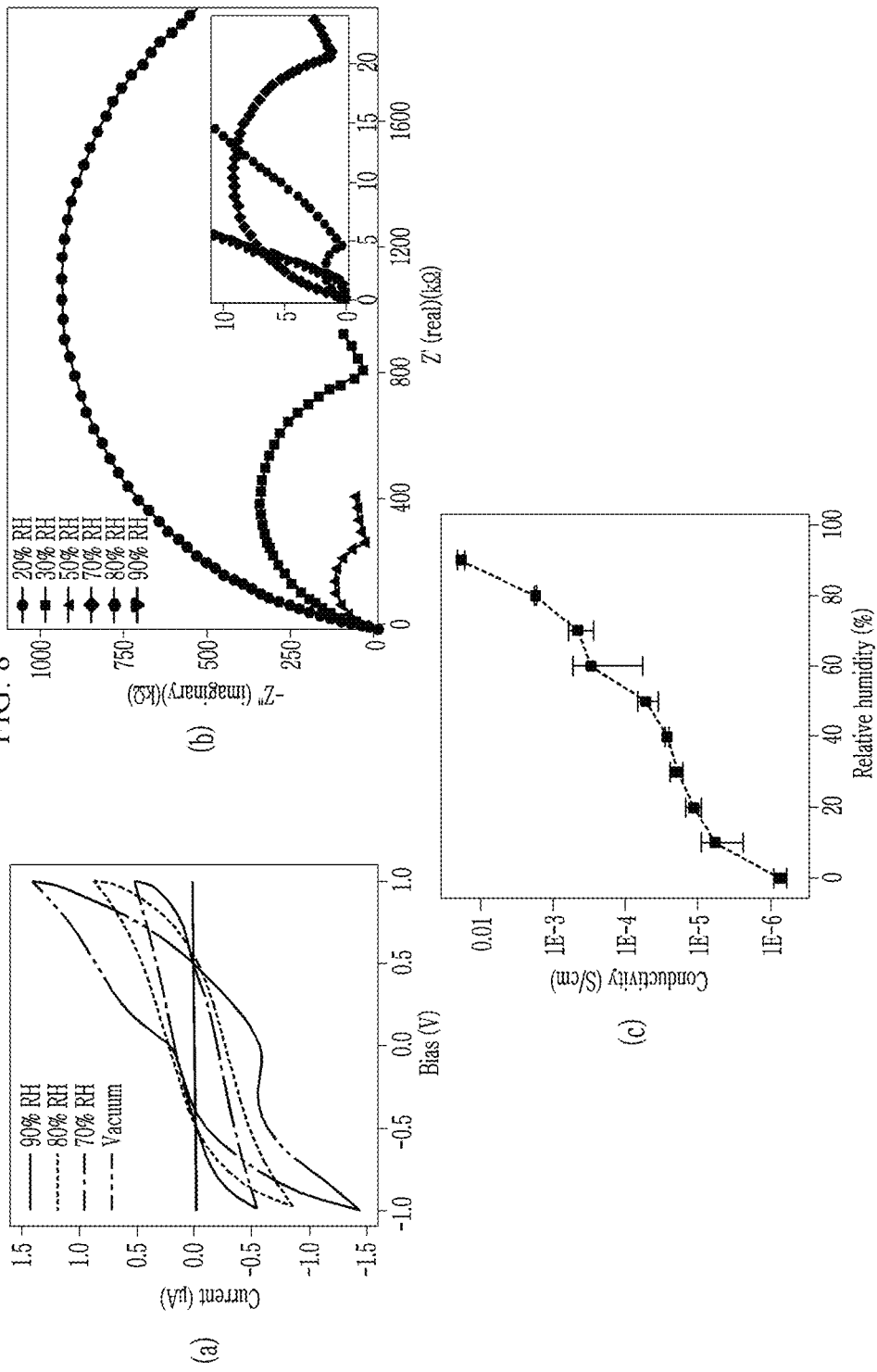
FIG. 8 depicts the impedance and conduction characteristics of the peptide-inorganic material composite film according to an experimental example of the present invention. Panel (a) is a graph of current as a function of voltage, panel (b) is a nyquist plot, and panel (c) is a graph of conductivity as a function of percent relative humidity.

FIG. 8 shows impedance and conduction characteristics of the peptide-inorganic material composite film 40 according to an experimental example of the present invention.

Panel (a) of FIG. 8 shows an I-V curve according to a relative humidity (RH). It was confirmed that a hysteretic effect was apparent as the relative humidity increased.

Referring to panel (b) of FIG. 8, a nyquist plot is shown as a semi-circle and a tail. A diameter of the semi-circle represents a magnitude of the resistance (impedance), and the tail corresponds to accumulation of protons. That is, it could be confirmed that as the relative humidity increased, the size of the semi-circle became smaller and the resistance (impedance) became smaller.

Referring to panel (c) of FIG. 8, it may be confirmed that calculated conductivity is 1.86 (±0.20)×10 −2 S/cm at 90% relative humidity and 25 DeletedTexts, and the conductivity increases as the RH increases.

Figure 9:
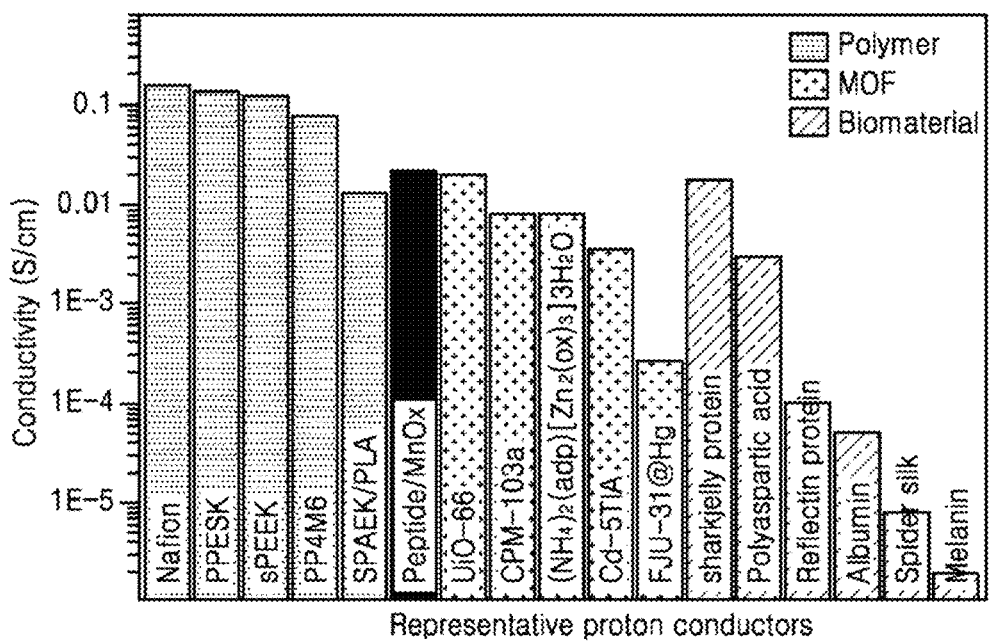
FIG. 9 is a graph showing comparison in conductivity between the peptide-inorganic material composite film according to an exemplary embodiment of the present invention and other proton conductors.

FIG. 9 is a graph showing comparison in conductivity between the peptide-inorganic material composite film 40 according to an exemplary embodiment of the present invention and other proton conductors.

Referring to FIG. 9, the peptide-inorganic material composite film 40 of the present invention exhibits high conductivity even when compared with melanin and albumin, etc., which are biomaterials, and UiO-66 and CPM-103a, etc., which are metal-organic frameworks (MOF). The peptide-inorganic material composite film 40 of the present invention exhibits high conductivity equivalent to that of a proton conductive film formed of a polymer material used in the actual industry. Accordingly, it may be appreciated that the peptide-inorganic material composite film 40 of the present invention may have biocompatibility to be used sufficiently as the proton conductive film in bioelectronics field.

Figure 10:
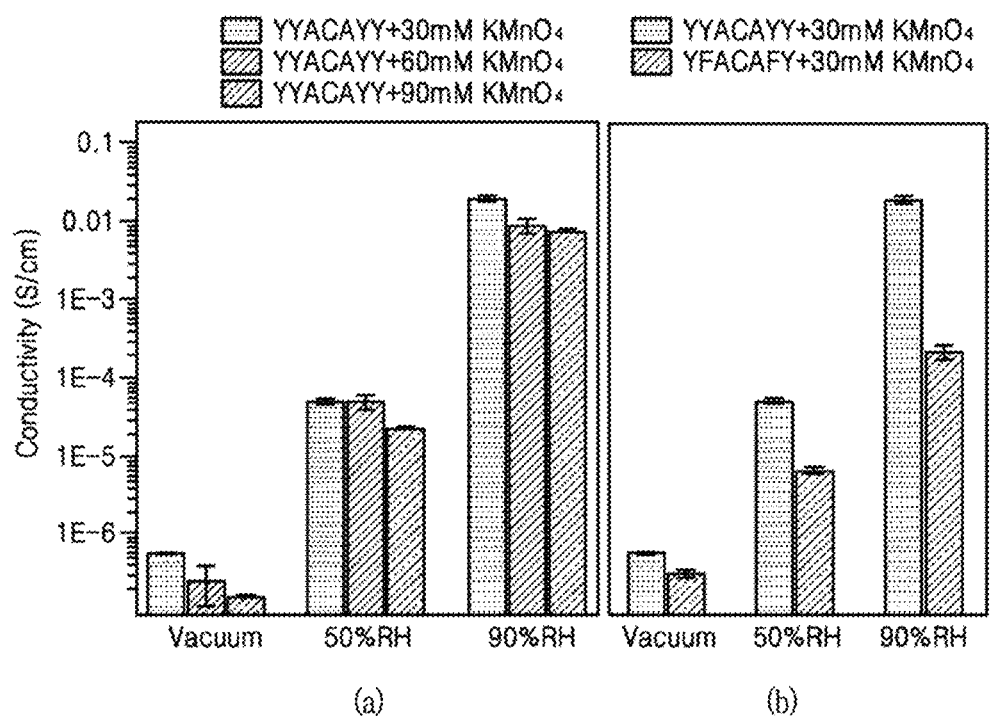
FIG. 10 presents graphs showing conductivities when different concentrations of a transition metal oxide aqueous solution and different kinds of amino acids are applied according to an exemplary embodiment of the present invention. Panel (a) is a graph showing conductivity at 30 mM, 60 mM, and 90 mM $KMnO_4$, while panel (b) compares conductivity of two peptides, each at 30 mM $KMnO_4$.

FIG. 10 presents graphs showing conductivities depending on concentrations of the transition metal oxide aqueous solution 30 according to an exemplary embodiment of the present invention and kinds of amino acids.

Panel (a) of FIG. 10 is a graph showing conductivities measured by applying different concentrations of $KMnO_4$ solution at 30 mM, 60 mM, and 90 mM at a vacuum, 50% RH, and 90% RH. It may be confirmed that the conductivity is affected by the concentration of the $KMnO_4$ solution, and the conductivity decreases as the concentration increases.

Panel (b) of FIG. 10 is a graph showing conductivity measured by changing only the amino acid sequence of the peptide in the same 30 mM $KMnO_4$ solution. The film 40 including a peptide having an amino acid sequence of YYACAYY and a peptide having an amino acid sequence of YFACAFY obtained by removing two tyrosines from the amino acid sequence of YYACAYY and disposing phenylalanine having an aromatic ring such as tyrosine in the site where the tyrosine is removed, was manufactured and experimented.

As a result of measurement of conductivity, YYACAYY shows higher conductivity than YFACAFY in all of vacuum, 50% RH, and 90% RH. It means that the peptide plays a very important role in conductivity. Further, it was confirmed that the conductivity of the peptide-inorganic material composite film 40 could be changed depending on the amino acid sequence of the peptide or the kind of the peptide.

Figure 11:
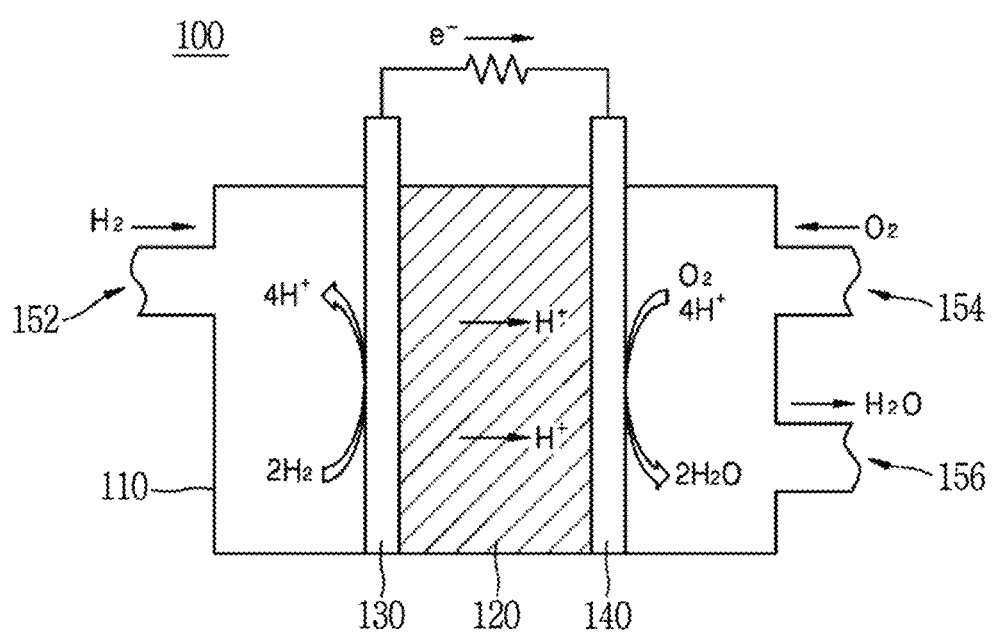
FIG. 11 is a schematic diagram showing a fuel cell system including the peptide-inorganic material composite film according to an exemplary embodiment of the present invention.

Hereinafter, an application example of the peptide-inorganic material composite film according to an exemplary embodiment of the present invention will be described with reference to FIG. 11. FIG. 11 is a schematic diagram showing a fuel cell system including the catalyst according to an exemplary embodiment of the present invention.

Referring to FIG. 11, the fuel cell system 100 may include an electrolyte membrane 120, a first electrode (anode) 130, and a second electrode (cathode) 140. Further, the fuel cell system 100 may include a cover part 110 in which first to third inlet/outlet parts 152, 154, and 156 are provided and the first and second electrodes 130 and 140 and the electrolyte membrane 120 are disposed.

The fuel cell system 100 of the present exemplary embodiment may be a solid oxide fuel cell (solid oxide fuel cell: SOFC), but is not limited thereto. The first and second electrodes 130 and 140 and the electrolyte membrane 120 may constitute one unit cell, and a plurality of unit cells may be stacked to constitute a fuel cell.

In the fuel cell system 100, an electrochemical reaction is represented by Reaction Schemes 1 and 2 below:

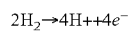  [Reaction Scheme 1]

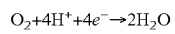  [Reaction Scheme 2]

In the first electrode 130, positive ions are generated by an oxidation reaction of hydrogen, and in the second electrode 140, water may be generated by a reduction reaction of oxygen. Here, electrons are generated in the first electrode 130 and electrons are consumed in the second electrode 140, and thus, electricity flows when the two electrodes are connected to each other.

The first and second electrodes 130 and 140 may be formed of a semiconductor or a conductive material, respectively. At least one surface of the first and second electrodes 130 and 140 may be coated with an oxygen reduction reaction catalyst.

The electrolyte membrane 120 may be used as a proton conductive membrane as the peptide-inorganic material composite film 40 of the present invention described above. The electrolyte membrane 120 may separate the first electrode 130 and the second electrode 130 from each other while simultaneously enabling flow of protons between the electrodes.

Although the fuel cell system has been exemplarily described as an electrochemical system according to the exemplary embodiments of the present invention, the present invention is not limited thereto, and the peptide-inorganic material composite film 40 according to an exemplary embodiment of the present invention may be used in various electrochemical reaction systems in which the proton conductive membrane is used.

Although the specific embodiments of the present invention have been illustrated and described above, it is obvious to those skilled in the art that the present invention is not limited to the disclosed embodiments, and that various changes and modifications may be made without departing from the spirit and scope of the present invention.

Therefore, such changes or modifications should not be individually understood from the technical spirit and viewpoint of the present invention, and modified embodiments should be included in the claims of the present invention.

DESCRIPTION OF SYMBOLS

10: Substrate
20: Peptide solution
21: Peptide film
30: Transition metal oxide aqueous solution
40: Peptide-inorganic material composite film

What is claimed is:

1. A peptide-inorganic material composite film comprising:
   a unit peptide including 4 to 15 amino acids, and
   a transition metal oxide hybridized with the unit peptide,
   wherein the unit peptide includes at least two tyrosines, and
   the plurality of unit peptides positioned adjacent to each other have a form in which the tyrosines are linked,
   wherein the transition metal oxide includes any one selected from the group consisting of Mn, Co, Cu, Ni, Fe, Zr, Zn and Ce.

2. The peptide-inorganic material composite film of claim 1, wherein:
   the peptide-inorganic material composite film includes dityrosine.

3. The peptide-inorganic material composite film of claim 1, wherein:
   the transition metal oxide is represented by Chemical Formula 1 below:

$$A_{1-\delta}O \qquad \text{[Chemical Formula 1]}$$

in Chemical Formula 1, A is a transition metal, and $\delta$ is $0<\delta<0.5$.

4. The peptide-inorganic material composite film of claim 3, wherein:
   the $\delta$ is $0<\delta<0.25$, $0.25<\delta<\frac{1}{3}$ or $\frac{1}{3}<\delta<0.5$.

5. The peptide-inorganic material composite film of claim 1, wherein:
   the transition metal oxide includes at least two of divalent, trivalent and quadrivalent transition metals.

6. The peptide-inorganic material composite film of claim 1, wherein:
   the peptide-inorganic material composite film has an absorbance of 0.05 to 0.7 at a wavelength of 280 to 500 nm.

7. The peptide-inorganic material composite film of claim 1, wherein:
   a PL intensity of the tyrosine decreases as a content of the transition metal oxide increases at a wavelength of 305 nm.

8. The peptide-inorganic material composite film of claim 1, wherein:
   resistance of the peptide-inorganic material composite film decreases as relative humidity increases.

9. The peptide-inorganic material composite film of claim 1, wherein:
   the unit peptide has at least one of YYYY, YYCYY, YDCDY, YHCHY, YFCFY, FYCYF, YYYCYYY, YFACAFY, and YYACAYY sequences, and
   Y is tyrosine, A is alanine, C is cysteine, D is aspartic acid, H is histidine, and F is phenylalanine.

* * * * *